United States Patent Office 3,773,914
Patented Nov. 20, 1973

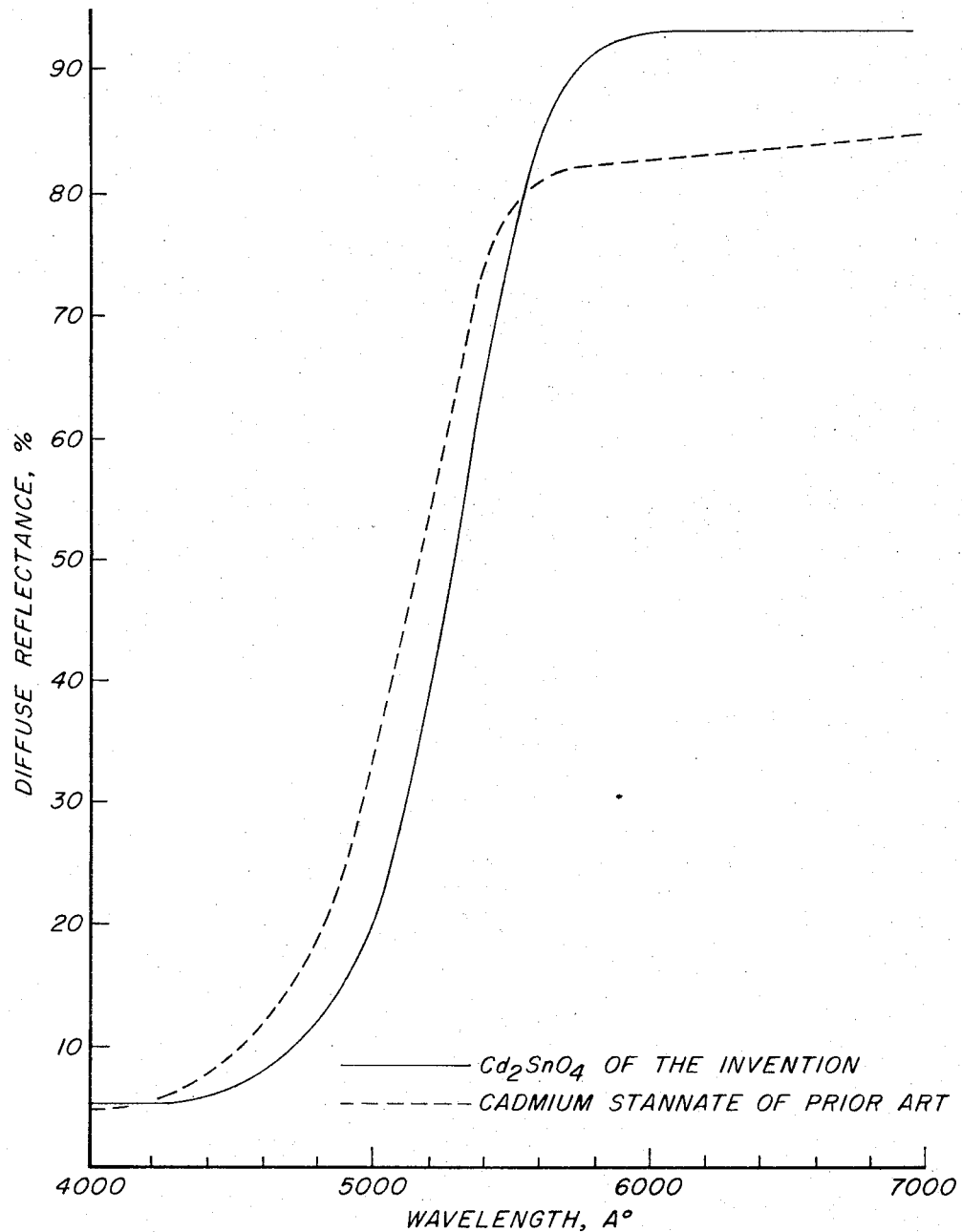

3,773,914
CADMIUM STANNATE YELLOW PIGMENT AND
METHOD OF PREPARATION
Arthur Jack Nozik, Westport, Conn., assignor to American
Cyanamid Company, Stamford, Conn.
Filed Sept. 20, 1971, Ser. No. 181,915
Int. Cl. C01g 19/00
U.S. Cl. 423—593                                    5 Claims

ABSTRACT OF THE DISCLOSURE $Cd_2SnO_4$ (cadmium stannate) has been found to provide a yellow pigment of high color intensity while exhibiting excellent light fastness and heat stability. This has been achieved by minimizing the oxygen vacancy concentration in macromolecular structure.

BACKGROUND OF THE INVENTION

This invention relates to new and improved pigments and processes of their production. More particularly, it relates to a $Cd_2SnO_4$ (cadmium stannate) yellow pigment which exhibits high color intensity, while maintaining excellent light fastness and heat stability.

Various yellow pigments have been proposed in the past for commercial application. Organic pigments presently being used include Hansa Yellow and Benzidine Yellow, while the popular inorganic pigments include chrome yellow and cadmium yellow. Virtually all of the yellow pigments presently in use, however, are deficient in one or more of the required properties of light fastness, heat resistance, chemical resistance, weather resistance and high color intensity.

Attempts have been made to respond to this need for an improved material by employing yellow pigments consisting of the oxides of titanium, antimony and nickel as illustrated in U.S. Pat. 2,257,278. However, these attempts have yielded less than satisfactory results. The yellow color obtained is pale, and if the color is intensified an undesirable grayness is evident which renders the pigment useless for a variety of practical applications.

Cadmium stannate was first prepared as a powder by A. J. Smith (Acta. Cryst., 13, 749 (1960)), who simply reported its crystal structure as orthorhombic, and presented powder diffraction data. M. Hassanein (J. Chem. U.R.A., 9, 275 (1966)) later repeated this preparation. The material so prepared has been found to be inadequate for use as a pigment. It lacked sufficient color intensity for commercial application. Further, the particles produced by the disclosed procedure were not of pigmentary size, being too large to provide sufficient tinting strength. As a result of all these optical and physical inadequacies, the material produced according to the prior art was found to be totally inadequate for commercial application as a pigment.

OBJECTS OF THE INVENTYION

It is an object of the present invention to produce a yellow pigment showing none of the disadvantages of the pigments presented by the prior art.

It is another object to provide an intense, yellow pigment having excellent light and heat stability suitable for use in an outdoor environment.

Another object is to provide an intense yellow pigment especially suitable fo ruse in plastic compositions requiring excellent heat stability in their production .

Other objects, features and advantages of this invention will become more apparent from the following description of preferred embodiments thereof and from the drawing which is a graph illustrating the reflection spectra of cadmium stannate powder prepared by different methods.

BRIEF DESCRIPTION OF THE INVENTION

In accordance with the foregoing objects it has been found that $Cd_2SnO_4$ (cadmium stannate) of low oxygen vacancy concentration provides an intensely yellow pigment having a color saturation value greater than 75%. This has been achieved by a process comprising the steps of: intimately admixing a precursor of cadmium oxide with a precursor of stannic oxide in appropriate molar ratio; calcining the admixture in an oxygen rich environment; and slow cooling the reaction product. Optimally the calcination is carried out at a temperature of from 900° C. to 1150° C. for at least thirty minutes and slow cooling is at a rate of less than about one degree centigrade per minute whereby pigmentary particles can be realized.

DRAWING

The sole drawing is a graphical comparison of the diffuse reflection spectra of $Cd_2SnO_4$ powder prepared according to the invention and $Cd_2SnO_4$ powder prepared according to the prior art.

DETAILED DESCIPTION OF INVENTION

According to the present invention, it has been unexpectedly found that the pigmentary properties of $Cd_2SnO_4$ (cadmium stannate) may be regulated by controlling the presence of donor states in the form of oxygen vacancies in the macromolecular structure.

It has been discovered that by limiting the oxygen vacancy concentration in the material to a minimal level, a pure and intense yellow pigment results which is highly stable to both heat, light, and the effects of weathering.

As pointed out in U.S. Ser. No. 181,916, filed Sept. 29, 1971, Light Transmitting Electrically Conducting Cadmium Stannate and Methods of Producing Same, filed concurrently with this application, an increase in the oxygen vacancy concentration of the $Cd_2SnO_4$ solid material results in its becoming more electrically conductive. Concurrently, the fundamental optical absorption edge of camium stannate is shifted toward the ultra-violet region of the spectrum, free carrier absorption in the red and near infra-red is introduced, and the diffuse reflection spectrum of the powder becomes less sharp. These optical effects cause the color of the more conductive cadmium stannate to appear greenish and to exhibit a lower percent color saturation and hence render it useless as a yellow pigment. These phenomena occur in cadmium stannate because of the low effective mass of its conduction electrons (0.04 of the mass of a free electron) as discussed in the above referenced copending application.

Instead of maximizing the oxygen vacancy concentration to produce high conductivity as proposed in U.S. Ser. No. 181,916 the oxygen vacancy concentration and conductivity according to the present invention is minimized by slow cooling the reactants in an oxygen rich environment. A product results which is ideally suited for use as a yellow pigment. Its color is pure and intense and its performance is superior when subjected to the effects of light, heat, and weathering.

In order that one skilled in the art may better judge the pigment proposed by this invention, a method of describing the color intensity of the pigment based on the well-known chromaticity diagram has been used to provide comparative values hereinafter designated as the "percent color saturation." To obtain these values, the pigment is pressed into a pellet and its visible diffuse reflection spectrum is obtained from a General Electric recording spectrophotometer. These data were then used to calculate the tristimulus values and chromatic coordinates. The chromatic coordinates are plotted on a standard chromaticity diagram in which the pure saturated spectral colors are represented by a horse shoe locus and non-spectral colors are located within the horse shoe locus. White is located in the center region of the figure and a line may be drawn from this point through any other point representing a smalpe color defined by the chromatic coordinates. The intersection of this line with the locus defines the dominant wavelength and the relative distance of the sample color point from the white color point divided by the relative distance of the white color point from the locus intersection multiplied by 100 is the percent color saturation.

In general, high "percent color saturation" values are obtained when the diffuse reflection spectra exhibit a very sharp rise in the diffuse reflectance over a very narrow range of wave length. As seen in the graphical comparisons of the sole drawing, the $Cd_2SnO_4$ of the invention shows a steeper absorption slope than the cadmium stannate of the prior art. The percent color saturation values for the $Cd_2SnO_4$ of the invention and the cadmium stannate of the prior art when calculated from their respective diffuse reflection spectra in the manner previously described were 83 and 73, respectively. This approximates a 15% increase in color intensity when the $Cd_2SnO_4$ of the invention is utilized as a pigment. The $Cd_2SnO_4$ pigment of the invention preferably has a percent color saturation greater than 80.

It should be re-emphasized that the preparation of the $Cd_2SnO_4$ must be so conducted that the oxygen vacancy concentration is less than about $10^{18}$ cm.$^{-3}$ resulting in conductivities less than $10^{-1}$ ohm$^{-1}$ cm.$^{-1}$. That is, the calcination is carried out in oxygen environment and slowly cooled at a rate of less than about 3 degrees centigrade per minute.

The $Cd_2SnO_4$ resulting from the process of the invention is pigmentary in size. Optimally, the $Cd_2SnO_4$ pigment ranges from 0.1 to 0.3 micron average diameter whereby excellent tinting strength is realized. However, useful pigment is obtained with particle size as large as $2\mu$.

It must be apparent that precursors of cadmium and tin oxides are numerous, including both organic and inorganic materials and for purposes of this disclosure includes the respective oxides of cadmium and tin. Illustrative of these precursors are cadmium carbonate, cadmium hydroxide, cadmium nitrate, cadmium oxalate, cadmium acetate, stannic hydroxide, stannic sulfate, stannous oxalate and diethyl tin.

The reaction as noted is to be carried out in an oxygen rich environment which optimally is 100% oxygen. However, satisfactory pigment can be obtained with as low as 20% oxygen content, i.e., air.

The oxygen vacancy concentration of the $Cd_2SnO_4$ pigment is critically related to the rate of cooling of the reaction product. The rate must be slow, i.e., less than three degrees centigrade per minute, in order to obtain the superior percent color saturation values. It is preferred to cool at a rate of less than about one degree centigrade per minute, at least between the calcination temperature and 500° C.

Calcination temperatures are useful between about 900° C. and 1150° C. Calcination below 900° C. results in decreased color intensity of the reaction product. Calcination above 1150° C. results in a significant loss of cadmium oxide. The duration of calcination should be limited to between 0.5 and 12 hours. The duration of calcination influences the particle size, particularly if carried out for more than 12 hours, whereupon the reaction product tends toward a particle size distribution which is no longer pigmentary. It has been found that calcination periods of one to two hours provides optimum pigmentary $Cd_2SnO_4$ of 0.1 to 0.3 micron average diameter, particularly, when precursors of cadmium and tin oxides are intimately mixed on an atomic scale.

Illustrative of this invention are the following two examples:

EXAMPLE 1

12.84 grams of CdO powder and 15.07 grams of $SnO_2$ powder are thoroughly mixed in a mortar and pestle and placed in an 150 ml. alumina boat. The boat is placed into a tube furnace maintained at 1050° C. and outfitted with an alumina tube through which pure $O_2$ is flowing. The reaction is carried out for 5 hours, after which time the temperature of the tube furnace is reduced at a rate of one degree centigrade per minute while the flow of oxygen is maintained. After the temperature of the tube furnace reaches 500° C., the furnace power is shut off, allowing the system to cool more rapidly to ambient temperature. The resultant $Cd_2SnO_4$ product consists of a bright yellow pigment having a percent color saturation value of 83.

EXAMPLE 2

9.12 grams of $CdCl_2 \cdot 2\frac{1}{2}H_2O$ and 2.35 milliters of anhydrous $SnCl_4$ are dissolved in 500 milliliters of water. The resulting solution is heated to 50° C. while being agitated, and a sufficient amount of a 1 molar solution of KOH is added to neutralize the solution and co-precipitate a mixed cadmium-tin hydrous oxide. In this example this amounts to 160 ml. of the 1 molar KOH solution. The resulting flocculant precipitate of cadmium-tin hydrous oxide is filtered and washed with water until all the chloride ion is removed. The washed filtration cake is dried in air at 110° C., then calcined in oxygen at 900° C. for 1 hour, and thereafter slow cooled in the presence of oxygen at a rate of 1 degree centigrade per minute. The resulting $Cd_2SnO_4$ product consists of a bright yellow pigment with a color saturation value greater than 78% and having a particle size ranging from 0.1 to $0.3\mu$ average diameter.

Referring again to the sole drawing, the diffuse reflection spectrum of the $Cd_2SnO_4$ of the invention was derived from the product of Example 1. The referenced cadmium stannate was produced essentially according to the articles by Smith and Hassanein in which the reaction was carried out in an air environment at 1050° C. for five hours by means of an electric furnace. The reaction product was then removed from the furnace and allowed to rapidly cool in air to room temperature.

The pigment materials of the present invention, in addition to presenting desirable colors, possess other properties rendering them particularly effective for the desired pigment uses without additional special treatment. For instance, these pigments were incorporated into paint formulations, and weathering tests were conducted under accelerated conditions which showed that such pigments possessed excellent light and heat stability. Automobile finishes which incorporated these pigments possessed highly desirable gloss characteristics and light fastness. In addition, the general photostability of the pigment was excellent.

I claim:
1. A process for preparing $Cd_2SnO_4$ pigment which comprises the steps of:
   (a) admixing a precursor of cadmium oxide with a reactive amount of a precursor of tin oxide;
   (b) reacting said admixture by heating in the presence of an oxygen rich environment at a temperature of 900° C. to 1150° C.; and
   (c) slow cooling the reaction product at a rate of less than 3° C. per minute in an oxygen rich environment.

2. A process for preparing $Cd_2SnO_4$ pigment which comprises the steps of:
   (a) admixing in an aqueous solution, a soluble cadmium compound with a reactive amount of a soluble stannic compound;
   (b) heating the resulting solution;

(c) precipitating a cadmium-tin hydrous oxide;

(d) calcining the precipitated cadmium-tin hydrous oxide in an oxygen rich environment at a temperature of 900° C. to 1150° C.; and (e) slow cooling the reaction product at a rate of less than 3° C. per minute in an oxygen rich environment.

3. A process of preparing $Cd_2SnO_4$ pigment comprising the steps of admixing one mol of a precursor of stannic oxide with two mols of a precursor of cadmium oxide, reacting said admixture by heating in the presence of oxygen at from 900° C. to 1150° C. for from 0.5 hour to 12 hours, cooling the reaction product at a rate less than one degree centigrade per minute to a temperature of at least 500° C. in an oxygen rich environment and thereafter recovering the pigmentary product.

4. Intensely yellow $Cd_2SnO_4$ characterized in that said $Cd_2SnO_4$ has an oxygen vacancy concentration of less than about $10^{18}$ cm.$^{-3}$ which corresponds to an electrical conductivity of less than $10^{-1}$ ohm$^{-1}$ cm.$^{-1}$, and by a color saturation value of greater than 80% produced by the process of claim 3.

5. The process of claim 1 wherein the oxygen rich environment is pure oxygen.

References Cited

Hassanein: "Journal of Chemistry, U.A.R." vol. 9, 1966, pp. 275–279.

Smith: "Acta Crystallographia," vol. 13, 1960, pp. 749–752.

Tromel: "Zeitschrift fur Anorganische und Allgemeine Chemie," vol. 371, 1969, pp. 237–247.

Choisnet et al.: "Comptes Rendus," series C, vol. 266, 1968, pp. 543–545.

HERBERT T. CARTER, Primary Examiner

UNITED STATES PATENT OFFICE
CERTIFICATE OF CORRECTION

Patent No. 3,773,914　　　　　　　　　　Dated November 20, 1973

Inventor(s) ARTHUR JACK NOZIK

It is certified that error appears in the above-identified patent and that said Letters Patent are hereby corrected as shown below:

Column 1, line 56 "INVENTYION" should read

-- INVENTION --.

Column 1, line 64 "fo ruse" should read -- for use --.

Column 3, line 7, "smalpe" should read -- sample --.

Signed and sealed this 23rd day of April 1974.

(SEAL)
Attest:

EDWARD M. FLETCHER, JR.　　　　　　C. MARSHALL DANN
Attesting Officer　　　　　　　　　　Commissioner of Patents Room 518A